United States Patent [19]

Roth et al.

[11] 4,282,025
[45] Aug. 4, 1981

[54] CARRIAGE FOR TRANSPORTING SHEETS OF GLASS AND FOR PLACING THEM IN A PRESS FOR IMPARTING A CONVEX SHAPE

[75] Inventors: Mario Roth, Aachen; Werner Pagel, Herzogenrath; Günther Schmidt, Richterich, all of Fed. Rep. of Germany

[73] Assignee: Saint Gobain Industries, Neuilly-sur-Seine, France

[21] Appl. No.: 105,913

[22] Filed: Dec. 21, 1979

[30] Foreign Application Priority Data

Dec. 22, 1978 [FR] France ................................ 78 36188

[51] Int. Cl.³ ............................................ C03B 23/03
[52] U.S. Cl. ....................................... 65/273; 65/287; 65/289
[58] Field of Search ................. 65/106, 273, 287, 289, 65/104

[56] References Cited

U.S. PATENT DOCUMENTS

| 2,146,390 | 2/1939 | White . |
| 2,263,005 | 11/1941 | McClure . |
| 4,104,047 | 8/1978 | Seymour .............................. 65/273 |

FOREIGN PATENT DOCUMENTS

| 1937041 | 7/1969 | Fed. Rep. of Germany . |
| 1020465 | 11/1952 | France . |
| 1166157 | 6/1958 | France . |
| 664104 | 1/1952 | United Kingdom . |

*Primary Examiner*—Arthur D. Kellogg
*Attorney, Agent, or Firm*—Pennie & Edmonds

[57] ABSTRACT

A device for transporting a sheet of glass through sheet processing stations of a furnace. The device comprises a carriage having a carrying frame including a longitudinal horizontal member supporting a plurality of sheet hangers. The longitudinal horizontal member is rigidly connected at its center portion to the carriage and movably connected to the carriage at other portions.

4 Claims, 4 Drawing Figures

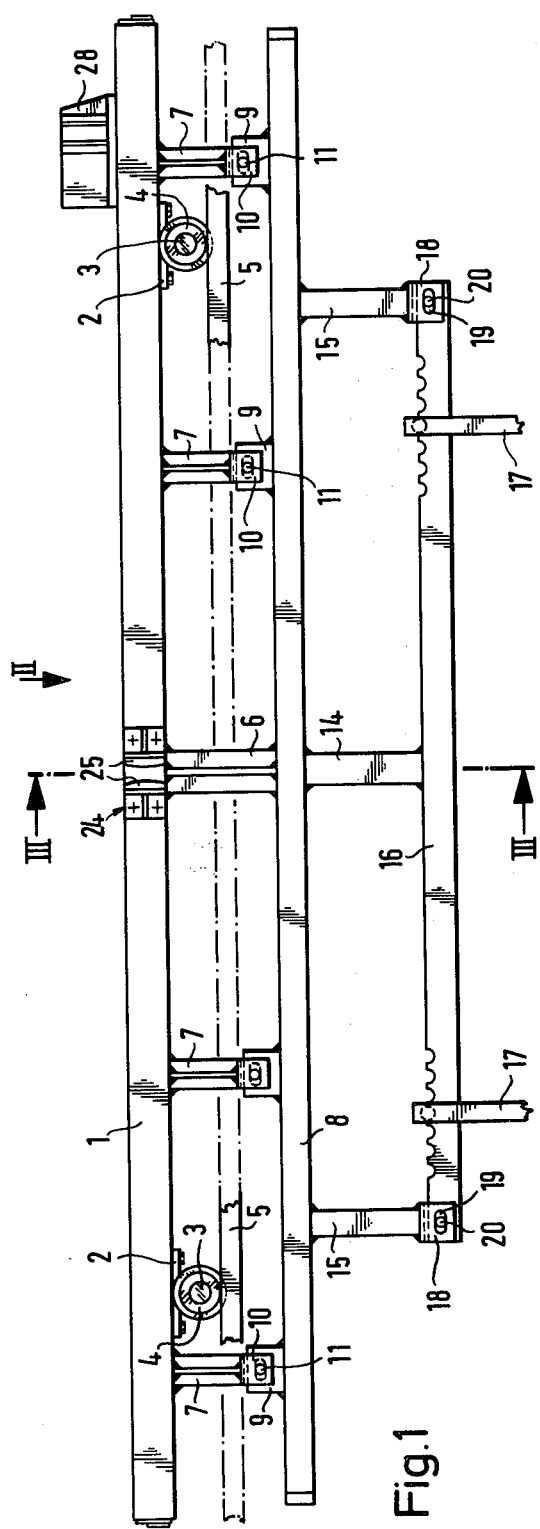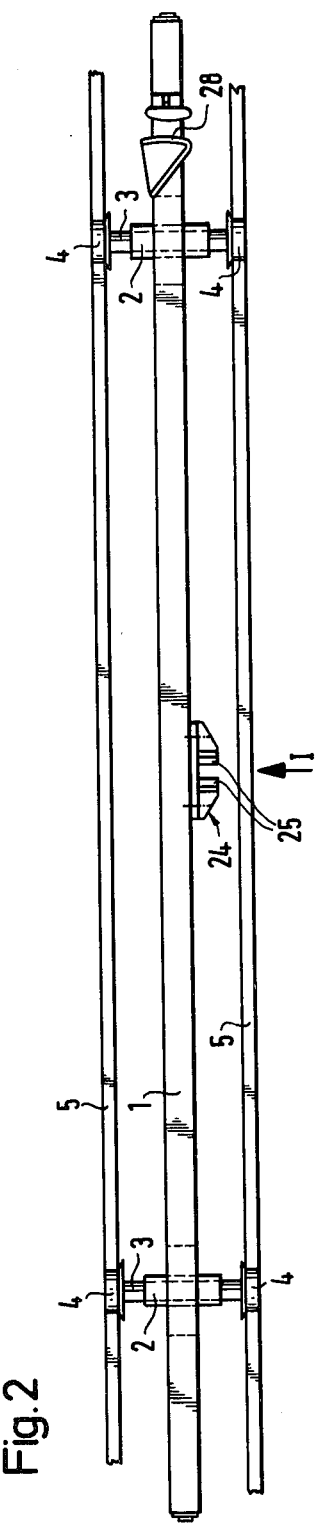
Fig.1
Fig.2

CARRIAGE FOR TRANSPORTING SHEETS OF GLASS AND FOR PLACING THEM IN A PRESS FOR IMPARTING A CONVEX SHAPE

TECHNICAL FIELD

The invention relates to a carriage for transporting a sheet of glass through a furnace having various sheet processing stations and including means for accurately positioning the sheet in a processing station.

BACKGROUND OF THE INVENTION

Carriages for transporting sheets of glass through a furnace having a plurality of sheet processing stations where the carriage rides on a rail positioned above the furnace have been previously proposed. Such carriages have included a carrying frame fitted with a longitudinal horizontal member having hangers which project downwardly into the furnace and from which a sheet of glass is adapted to be suspended. An example of such a carriage is described in German Patent Publication No. 2607276.

In order for a sheet of glass to be formed into a convex shape, the furnace is provided with a convexing station including pressing tools mounted on rams where the sheet is suspended from the carriage so as to be positioned between the tools prior to the tools being pressed together to form the sheet into a convex shape. It is important that the sheet be precisely positioned between the tools in order that it may be accurately shaped, and it has been found that the greater the degree of curvature, that the greater is the need for accurate positioning. It has been proposed to include a guide fork on one of the pressing tools to surround and hold one of the clamps connecting the sheet to a hanger to further position the sheet during closing of the pressing tools. Such a device is disclosed in German Pat. No. 1,146,625.

When sheets having great degree of curvature are manufactured, and especially sheets having accentuated bends, as for example sheets which are made in installations such as described in German Pat. No. 2741965, it becomes necessary to position the sheet with respect to the convexing station with the utmost accuracy. This requires that the entire sheet suspension system be accurately positioned since the use of a guide fork alone as described above will not produce the degree of positioning necessary for accurately forming the sheets.

A problem that has existed with prior art devices having carriages for transporting sheets of glass through a furnace is that the carriage framework expands on being heated which can then effect accurate positioning of a sheet at the convexing station. It is known that a carriage 2–3 meters in length may expand in excess of 10 mm when subjected to high temperatures. This expansion may then result in a shift of the sheet in the convexing station even when the station is equipped with a guide fork as described above.

It is therefore an object of the invention to provide for a device which will accurately position a sheet of glass in a convexing station and which will reduce to a minimum any slight displacement of a sheet that might result from expansion of parts making up the structure supporting the sheet when the structure is subjected to high temperatures.

GENERAL DESCRIPTION OF THE INVENTION

Broadly a device constructed according to our invention is adapted for use with a furnace having a plurality of sheet processing stations including a convexing station and over which a rail extends. The convexing station has movable tools adapted to press against a sheet to form it into shape. The device itself comprises a carriage movable on the rail where the carriage has a carrying frame including a first rigid unitary horizontal longitudinal member which supports a plurality of sheet hangers. The first horizontal longitudinal member is longitudinally and vertically rigidly connected at its center portion to the carrying frame and is slidably connected at other portions so that it may slide horizontally with respect to the carrying frame. This arrangement reduces to a minimum any shift in positioning of a sheet which might result from expansion of the parts making up the device since the expansion of the carrying member will be symmetrical from the rigidly connected center portion.

In addition the invention provides means for coupling the center of the carriage with a coupling member fixed along the median plane of the convexing station. This arrangement, combined with the rigid attachment of the center portion of the horizontal longitudinal member to the carriage, further assures that the inevitable expansion of the parts making up the device will be symmetrically distributed about the median line of the convexing station thus minimizing any shifting of the sheet from the median plane.

BRIEF DESCRIPTION OF THE DRAWINGS

FIG. 1 is a side view of the device constructed according to the invention;

FIG. 2 is a plan view of the device of FIG. 1;

BEST MODE FOR CARRYING OUT THE INVENTION

Figure 3:
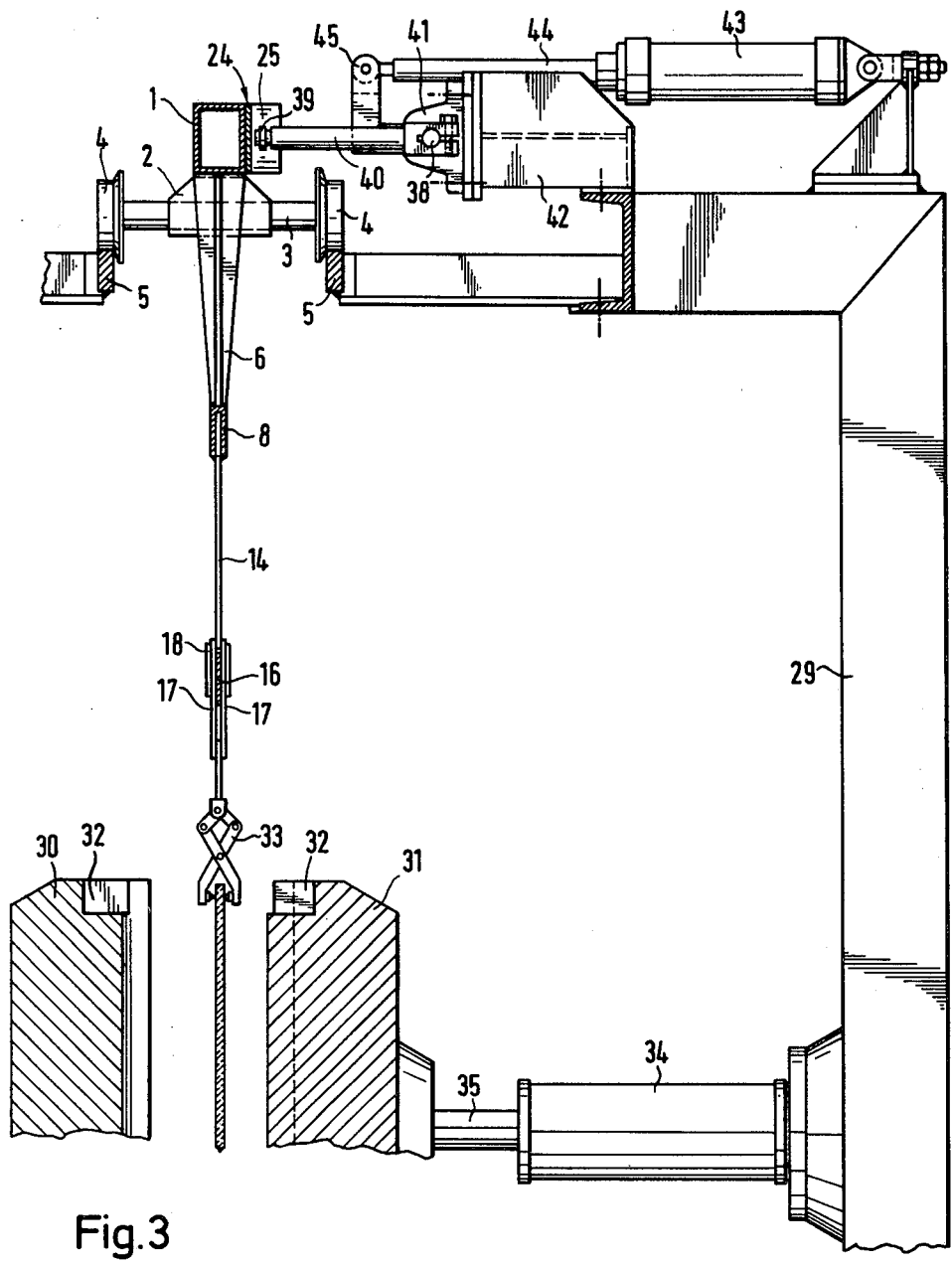
FIG. 3 is an enlarged partial sectional view taken along lines 3—3 of FIG. 1 and illustrating a portion of a convexing station; and, FIG. 4 is a top view of the convexing station illustrated in FIG. 3.

Referring to FIGS. 1 and 2 there is illustrated a transport carriage having a rigid chassis 1 in the shape of a rectangular tube on which are mounted two pillor blocks 2. An axle 3 extends through each pillow block and serves as a support for wheels 4. Wheels 4 in turn run on rails 5 above a furnace in which sheets of glass are reheated and which includes various sheet processing stations.

The chassis 1 has tie rods 6 and 7 on its underside which connect with a first rigid unitary longitudinal horizontal member 8 which extends parallel to the chassis. Longitudinal horizontal member 8 is horizontally and vertically rigidly fastened to tie rod 6 by welding and is located at the middle of the chassis. The member 9 has ears 9 welded to the upper part thereof which meet with a pair of corresponding ears 10 which form a cap on the ends of tie rods 7. The ears 10 are connected to the ears 9 by means of bolts 11 passing through elongated horizontal holes 12. The horizontal holes 12 connecting with the bolts 11 form a horizontal sliding means connecting portions of the member 8 to the carriage so that the member may expand symmetrically with respect to the middle portion when subjected to high temperatures.

The member 8 has a central tie rod 14 and front and rear tie rods 15 connected at its underside by welding. The tie rods 14 and 15 in turn carry lower horizontal longitudinal member 16 on which clamps adapted to clasp a sheet of glass are supported by means of hangers 17. The member 16 comprises a first horizontal longitudinal member while the member 8 comprises a second horizontal longitudinal member. The center portion of member 16 is rigidly connected to the tie rod 14 by welding and other portions of the bars are connected in a horizontal sliding manner to the end of tie rods 15 by means of caps 18 which are provided with elongated horizontal holes 19 which accommodate bolts 20 passing through longitudinal member 16. This arrangement, like the connection of member 8 to the carriage provides for a symmetrical expansion of the member 16 when subjected to high temperatures.

Chassis 1 has a coupling member 24 mounted on its side and at its center. The coupling member 24 includes two projecting guide members spaced apart so as to form a slot which narrows in its central portion as shown in FIG. 1.

Chassis 1 has a coupling member 28 at one of its ends into which a stud, not shown, may be connected and where the stud forms part of the motor system for moving the carriage from one processing station to another processing station.

Figure 4:
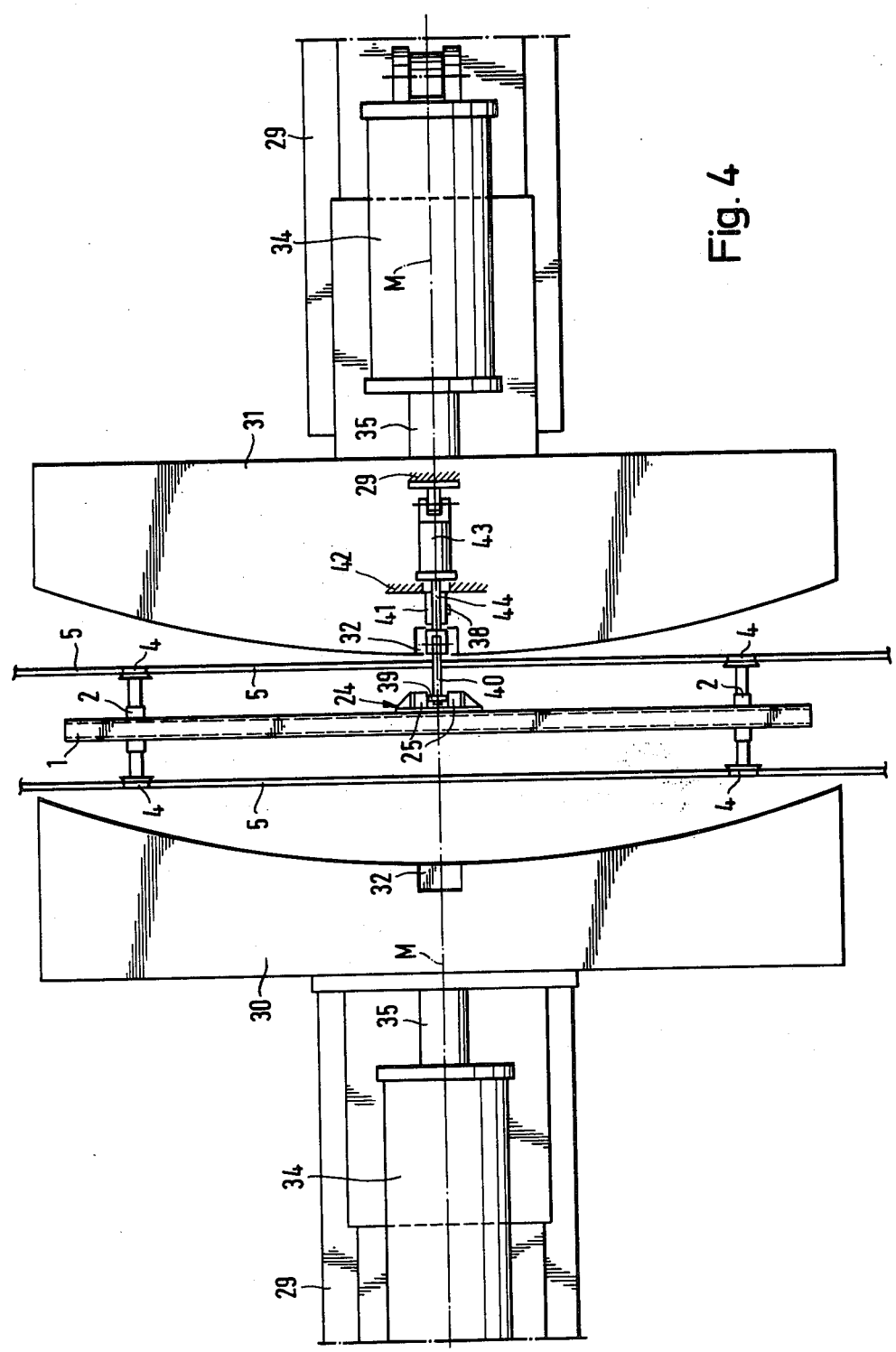

Referring to FIGS. 3 and 4, the mounting on which the carriage is positioned with respect to the convexing station is illustrated. As shown, the entire apparatus of the convexing station is mounted on the framework 29. The principal member of the convexing station comprises two complementary convexing tools 30, 31 which together form a press. These tools which have grooves 32 along their upper edges, are mounted on jacks 34 by means of jack shafts or rams 35. The grooves 32 are intended to receive fastening clamps 33 which fasten the hangers 17 to a sheet of glass.

Framework 29 supports rails 5 and includes a centering member which acts in concert with coupling member 24 of the carriage. The centering member comprises a coupling roller 39 mounted on the end of an arm 40 which is pivotable on an axle 38. Axle 38 is mounted on a pillow block 41 which in turn is fixed to a bracket 42 mounted on framework 29. A double action jack 43 serves to rock arm 40 about axle 45 so as to cause the coupling roller 39 to rise or fall and to engage or disengage with the slot in the coupling member 24. The roller is located in the median plane MM as shown in FIG. 4 of the convexing station such that the carriage may be positioned accurately symmetrically with respect to this plane.

In horizontal installations known as travelling furnaces, the carriage should be adjusted with respect to the convexing station.

In pit installations, where the furnace, or at least its last chamber is placed beneath the convexing press, adjustment of the transport carriage may be made with respect to the chamber of the furnace. It then becomes necessary to assure that the suspension device, which causes the carriage to rise from the furnace toward the convexing press, does not cause any horizontal shifting of the carriage.

We claim:

1. A device for transporting a sheet of glass through a furnace having a plurality of sheet processing stations including a sheet convexing station having movable forms for pressing a sheet of glass into a convex shape and where said device comprises a carriage movably mounted on a rail extending above said furnace with said carriage having a carrying frame including a first rigid unitary horizontal longitudinal member supporting a plurality of sheet hangers; the improvement comprising in that said carriage has a coupling member at its middle adapted to couple with a coupling member positioned at said convexing station to anchor and position said carriage with respect to said convexing station; in that said first horizontal longitudinal member is longitudinally and vertically rigidly connected at its center portion to said carriage, and in that horizontal sliding means are provided for slidably connecting other portions of said first horizontal longitudinal member with respect to said carriage.

2. A device according to claim 1 the improvement further characterized in that said horizontal sliding means comprises elongated shaped holes adapted to be slidably engaged by pins.

3. A device according to claim 1 the improvement further characterized in having in addition a second horizontal longitudinal member extending parallel to and positioned between said first longitudinal member and said carriage with said second horizontal longitudinal member being rigidly connected at its center portion by a tie rod to said carriage and being horizontally slidably connected at other of its portions by tie rods to said carriage.

4. A device according to claim 1 the improvement further comprising in that the coupling member associated with said carriage is adapted to be coupled with a roller mounted on the end of a pivotable arm positioned in the median plane of the convexing station.

* * * * *